W. M. SQUIRE.
MACHINE FOR GATHERING AND BUNCHING HAY AND GRAIN.
APPLICATION FILED DEC. 20, 1910.
1,134,928.  Patented Apr. 6, 1915.
3 SHEETS—SHEET 1.
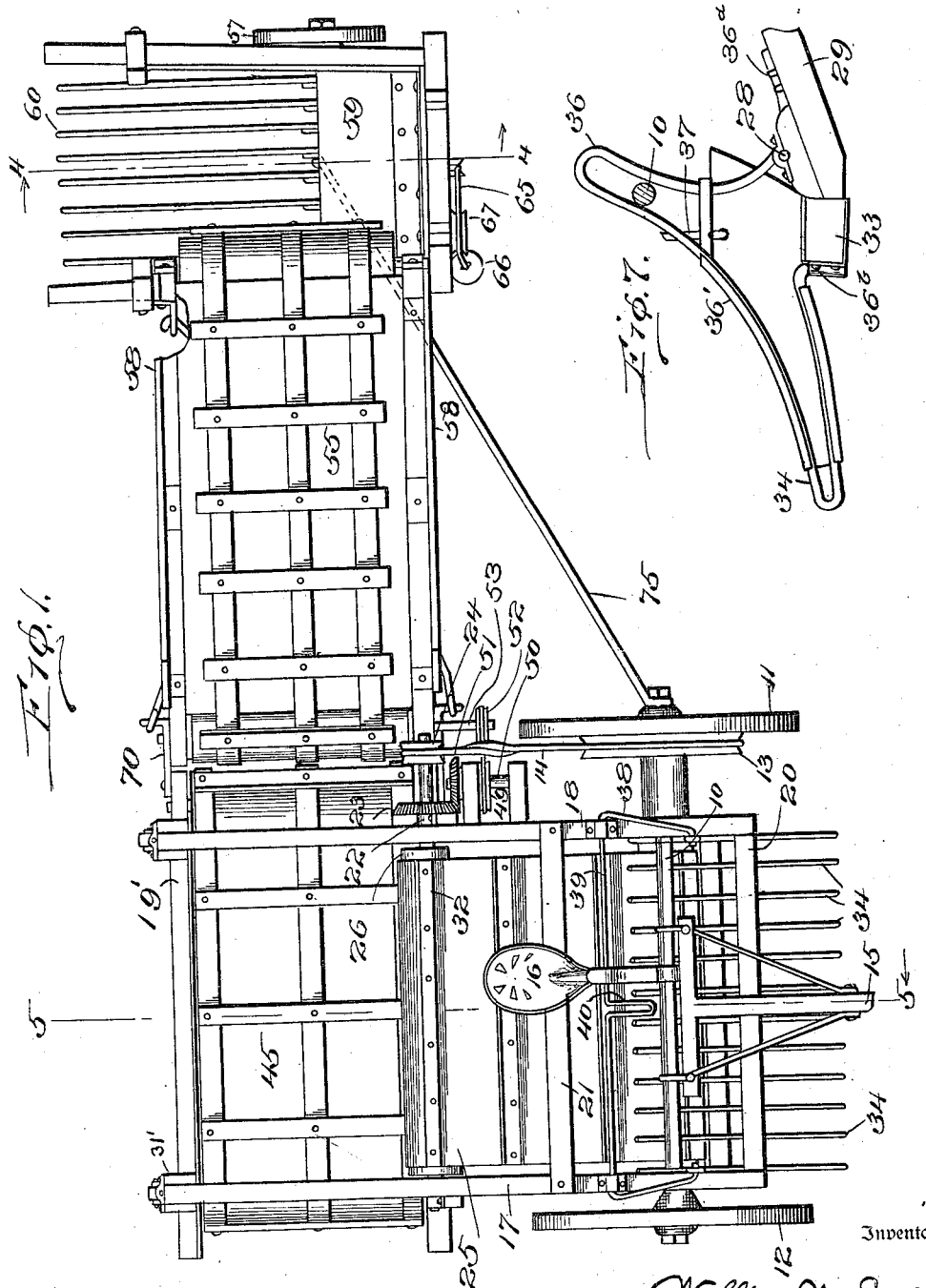

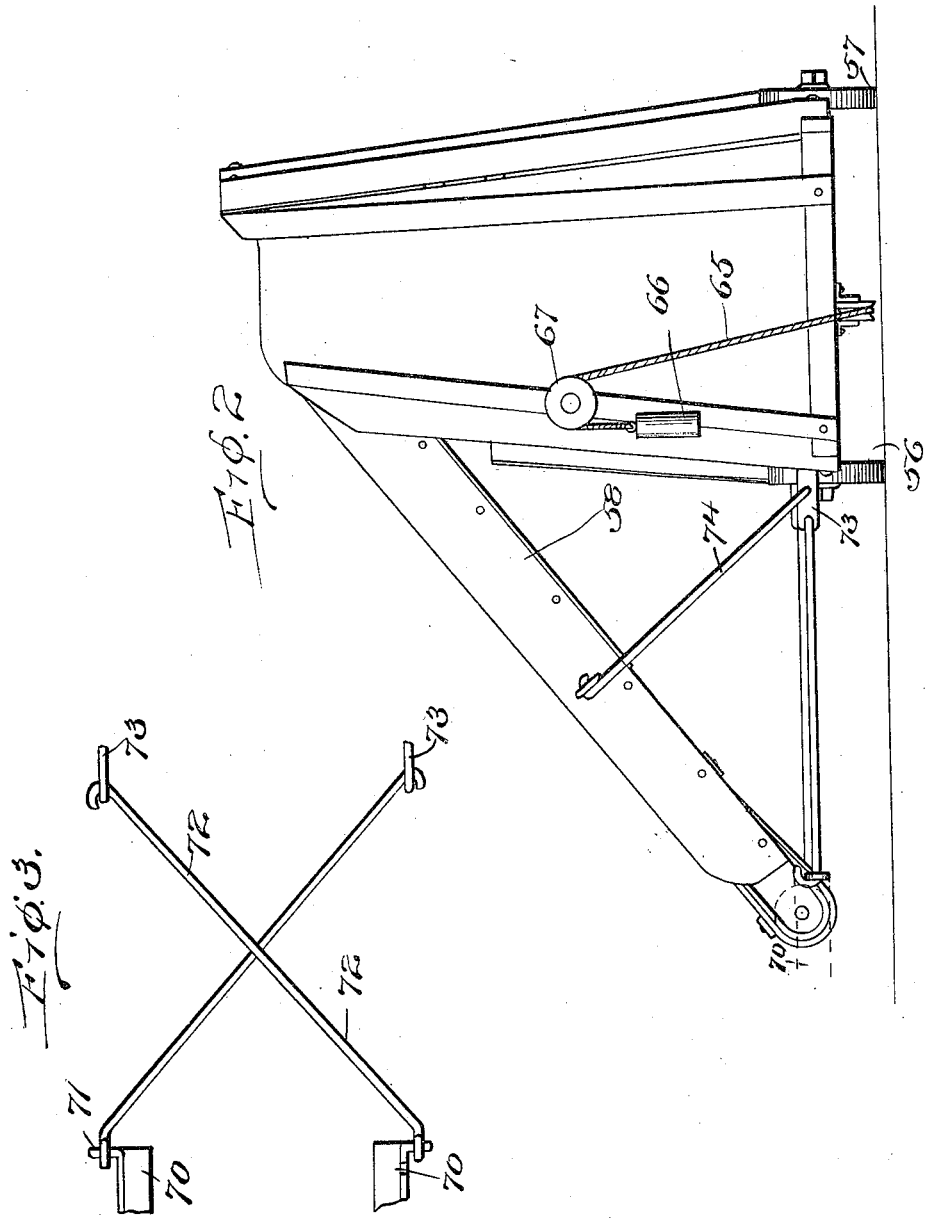

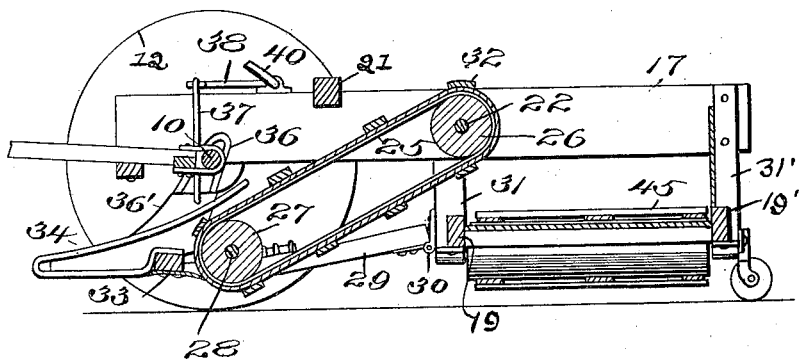
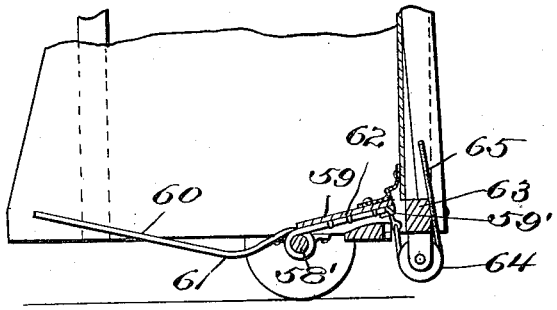
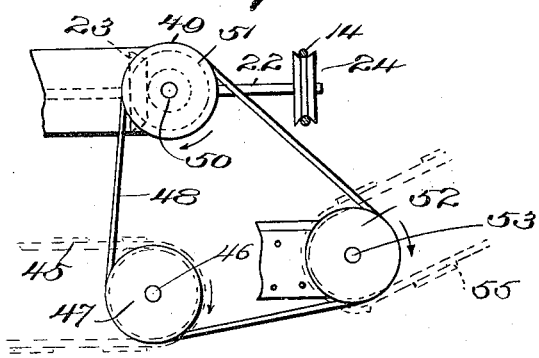

UNITED STATES PATENT OFFICE.

WILLIAM M. SQUIRE, OF RED CLOUD, NEBRASKA.

MACHINE FOR GATHERING AND BUNCHING HAY AND GRAIN.

1,134,928.  Specification of Letters Patent.  Patented Apr. 6, 1915.

Application filed December 20, 1910. Serial No. 598,381.

*To all whom it may concern:*

Be it known that I, WILLIAM M. SQUIRE, citizen of the United States, residing at Red Cloud, in the county of Webster and State of Nebraska, have invented certain new and useful Improvements in Machines for Gathering and Bunching Hay and Grain; and I do hereby declare the following to be a full, clear, and exact description of the invention, such as will enable others skilled in the art to which it appertains to make and use the same.

This invention relates to machines for gathering and bunching hay and grain, and it consists in the novel construction hereinafter described and claimed.

In the accompanying drawings forming a part of this application, Figure 1 is a top plan view of the machine. Fig. 2 is an elevation of the bunching device with means for conveying the hay or grain thereto. Fig. 3 is a detail view of a portion of the construction shown in Fig. 2. Fig. 4 is a further detail of the construction shown in Fig. 2, being a vertical section of a portion thereof. Fig. 5 is a vertical section approximately on the line 5—5 of Fig. 1. Fig. 6 is a detail view showing an arrangement of pulleys and gear wheels for driving the conveyers. Fig. 7 is a detail view of the operating and guiding member of the gathering device.

In carrying out my invention, I provide a hay gathering device as shown in Figs. 1 and 5, in which the numeral 10 indicates the main axle, carrying wheels 11 and 12, and carrying also a pulley 13, loosely mounted on the axle but fast to wheel 11, for operating the conveyers hereinafter referred to. The tongue 15 is connected in any suitable manner.

The framework of the gathering device is composed of side members 17 and 18, and uprights 31, 31', cross bars 19 and 19', and cross bars 20 and 21 located as shown in Fig. 1. A shaft 22 is suitably mounted in members 17 and 18, and carries a beveled gear 23 and a pulley 24, which latter is driven by crossed belt 14 from pulley 13. The conveyer 25 of the gathering device passes over a drum 26 on shaft 22, and over a corresponding drum 27 on shaft 28 carried by a side bar 29 hinged at 30 to a rigid hanger member 31 carried by side bar 17. Members corresponding with members 29, 30 and 31 are carried by the opposite side of the framework, and are connected with side bar 18. The conveyer 25 is provided with transverse strips 32 which serve the usual purpose.

Connected with side bar 29 is a cross bar 33 which carries the prongs 34 of the gathering device, each of said prongs being composed preferably of a single piece of material bent upon itself in the manner shown in Figs. 5 and 7. The swinging structure carrying the prongs 34 is guided by loops 36 extending upward from the endmost prongs, struck on an arc around the hinge 30, and loosely passing around the axle 10. A plate 36' is secured to each loop 36 and also to cross bar 33, and the gathering device may be lifted by means of link 37 connected with the plates and operated through the medium of the arms 38 of the rock shaft 39 shown in Fig. 1.

A lever 40 is provided for use in operating the rock shaft, thereby controlling the gathering device proper.

The wire of the endmost prong has one end secured at $36^a$ to the bar 29 (Fig. 7), its body engaged by the turned-over edge of plate 36', and its other end secured at $36^b$ to cross bar 33. The gathering device carrying the prongs is hinged at 30 as previously stated, and is guided by the loops 36 moving over shaft 10 as the structure is raised and lowered.

A conveyer 45 is mounted transversely across the rear of the conveyer 25 and is disposed in a horizontal position and below the highest portion of conveyer 25, which is inclined in the manner shown in Fig. 5. This conveyer 45 is driven from shaft 46 carrying a pulley 47, which is in turn driven by belt 48, connected with pulley 49 (Fig. 6). The pulley last mentioned is mounted on a counter shaft 50 carrying a gear 51, which meshes with gear 23 previously referred to. Belt 48 also drives a pulley 52 mounted on shaft 53 designed to drive an elevating conveyer 55 for elevating the hay or grain to the bunching device.

The bunching device is carried at the side of the machine and is shown in plan in Fig. 1 and in elevation in Fig. 2. The buncher is carried on wheels 56 and 57, and consists of a body portion open toward the rear side and having connected therewith a frame 58, in which the conveyer 55 is located. In the lower portion of the bunching device and upon the axle 58' carrying the main wheels is a transverse plate or member 59 having connected therewith a plurality of prongs 60 designed to receive the hay or grain as it is dropped into the bunching device from conveyer 55. The prongs 60 are deflected at point 61 as shown in Fig. 4 and are then partially coiled about the axle 58′, and are connected with the transverse member 59 by suitable securing devices, their extreme ends projecting into cross piece 59′ and being secured thereto. The bottom of the bunching device is thus pivotally mounted upon the axle 58′ and is held in normal position by a counterbalance. On one of the lower cross-bars 63, a pulley 64 is mounted and a rope 65 passing around this pulley is connected at one end to the transverse member 59, and at the opposite end to a weight 66, for the purpose indicated. The rope 65 passes around a pulley 67 secured on the outside of the body portion of the bunching device.

The frame 58 carrying the conveyer 55 is connected with the framework of the gathering device by means of brackets 70 secured to said framework, these brackets having angular securing devices or ears 71 formed thereon, arranged for connection with bracing rods 72, which are connected with brackets 73 carried by the body portion of the bunching device. Shaft 53 of conveyer 55 connects the inner frame of the latter with the framework of the gathering device and serves as a driving shaft for such conveyer. Shaft 53 is supported by brackets 70. Secured also to brackets 73 are tie rods 74 connected with the framework 58 of the inclined conveyer 55, for the purpose of holding the latter in the required position. A tie rod 75 connects the axle 10 of the gathering device with the axle 58′ of the bunching device, and serves to hold the parts of the machine rigidly in line with each other.

In operation, the hay or grain is picked up by the prongs 34, received by the conveyer 25 associated therewith, carried back and dropped upon conveyer 45. The latter carries the material to the elevating conveyer 55 by which it is raised and discharged into the buncher. The hay or grain falling upon the tiltable bottom of the bunching device is disposed of as desired.

What I claim as new and desire to secure by Letters Patent, is:

1. In a device of the class described, the combination with a supporting frame, rigid hangers depending from its side bars, cross bars connecting the hangers, a main axle connecting the front ends of the side bars, wheels on this axle, other wheels supporting the rear end of the frame work, and a laterally moving carrier within said frame work; of a supplemental frame hinged to certain of said hangers and including a cross bar located below said axle, a series of prongs carried by this cross bar, the endmost prongs being continued upward into loops struck on arcs around the hinges and loosely embracing said axle, the extremities of these endmost members being connected respectively with said supplemental frame and its cross bar, end plates covering these members and having their edges bent over the prongs thereof, links rising from said plates, and a manually controlled rock shaft on the main frame connected with said links.

2. In a machine of the class described, the combination with a main frame having a cross axle near its front end, main wheels mounted loosely on said axle and one of them having a driving pulley fast on its hub, the gathering devices at the front end of said frame, a carrier leading from said devices rearward, a transverse carrier mounted in the rear end of said frame, a laterally projecting carrier whose frame is hinged to the main frame, and bunching mechanism at the outer end of this carrier; of a beveled gear and a pulley on one end of the rear shaft of the first-named carrier, said pulley being connected with the drive pulley, a counter shaft having a beveled gear meshing with that named and also having a pulley, the contiguous shafts of the two last-named carriers having pulleys underlying that on the counter shaft, and a triangular belt connecting these three pulleys, for the purpose set forth.

3. In a machine of the class described, the combination with means for gathering the material and conveying it to the rear, said means including a main framework mounted on wheels, and transversely moving carriers mounted on said framework; of a bunching device including a framework mounted on its own wheels and connected with the outer end of one of said transverse carriers, a tie-rod connecting this framework with the main framework, a rocking plate forming the bottom of said bunching device and pivotally mounted over its axle, a series of prongs carried by said plate and projecting forward from said axle, pulleys on the framework of the bunching device, and a rope leading from the rear edge of said plate downward under one pulley and then upward over another pulley to a counterweight, for the purpose set forth.

In testimony whereof I affix my signature in presence of two witnesses.

WILLIAM M. SQUIRE.

Witnesses:
F. G. SQUIRE,
C. P. JORDAN.

Copies of this patent may be obtained for five cents each, by addressing the "Commissioner of Patents, Washington, D. C."